United States Patent Office
3,639,339
Patented Feb. 1, 1972

3,639,339
REACTIVE POLYMERS AND PROCESS FOR THE PRODUCTION THEREOF
John Beaton and Douglas C. Edwards, Sarnia, Ontario, and Richard Helmut Wunder, Corunna, Ontario, Canada, assignors to Polymer Corporation Limited, Sarnia, Ontario, Canada
No Drawing. Filed May 20, 1968, Ser. No. 730,662
Claims priority, application Canada, June 28, 1967, 944,149
Int. Cl. C08d 5/02; C08f 27/02, 27/08
U.S. Cl. 260—47
1 Claim

ABSTRACT OF THE DISCLOSURE

A starting polymer of an olefinically-unsaturated compound and containing more than one halogen per polymeric molecule, particularly as an allylic halogen group, is treated with a multifunctional agent to form a polymer which is then curable with isocyanate. The multifunctional agent has as a first functional group a tertiary amine or a hydrocarbyl oxide of an alkali metal or mercaptide of an alkali metal; the agent has at least one other functional group which is less active than the first group and has a labile hydrogen atom capable of reacting with isocyanate.

---

This invention relates to reactive polymers of olefinically unsaturated compounds. In particular, it relates to the production of low molecular weight, terminally reactive polymers and their reaction with isocyanates.

It is well known to produce hydroxy terminated polymers of olefinically unsaturated hydrocarbons, such as butadiene and styrene, and react them with organic polyisocyanates to produce higher molecular weight chain-extended soluble polymers or crosslinked insoluble polymers. One process of preparing such polymers is described in Canadian Pat. 653,783 issued Dec. 11, 1962; this process involves polymerizing olefinically unsaturated aromatic hydrocarbon in an anhydrous system using anionic catalyst such as alkali metals or alkali metal hydrocarbyls, and contacting the product of polymerization with a carbonyl compound and then, a proton donor. The above process is limited to monomers which are inert to anionic catalysts; extreme precautions are required to eliminate moisture and other poisons in the polymerization and termination steps, if difunctional polymers are desired; random copolymerization of comonomers of different types is difficult; and the number of variations in the structure and composition of e.g. hydroxyl terminated polymers is rather limited.

It is an object of this invention to provide a new process of producing reactive polymers. Another object is to provide new improved reactive polymers of olefinically unsaturated compounds.

The present invention is based on the discovery that polymers of olefinically unsaturated compounds containing more than one halogen per polymeric molecule, for example two halogens in terminal positions, can be reacted with a multifunctional agent to form a polymer which is reactive with isocyanate, said agent containing a first functional group capable of reacting with one of said halogens and at least one other functional group having a labile hydrogen atom and being less active than said first group to said halogens.

The objects of the present invention are achieved by a process of producing an isocyanate-curable polymer of an olefinically unsaturated compound which comprises treating a low molecular weight isocyanate-non-reactive polymer of said compound, a major proportion of molecules of said polymer containing more than one halogen atom, with a multifunctional agent having a first functional group and at least one other functional group, said first functional group being selected from tertiary amines, hydrocarbyl oxides of alkali metals and mercaptides of alkali metals and being capable of reacting with one of said halogens to produce a bond between said polymer and said agent through a hetero atom selected from nitrogen, oxygen and sulphur, said other functional group being less active than the first group and having a labile hydrogen atom capable of reacting with isocyanate.

This invention also provides a novel isocyanate-curable polymer of an olefinically unsaturated compound, a major-proportion of molecules of said polymer containing more than one functional group, said functional group being attached to polymer molecule through a hetero atom selected from nitrogen, oxygen and sulphur, and having a labile hydrogen atom capable of reacting with isocyanate.

One polymer that can be used in the process of this invention is a low molecular weight material having a molecular weight at least about 1000. Above this lower limit, the molecular weight may vary widely, although it is desirable for some purposes that the polymer is liquid and pourable, preferably at room temperature, that is, that it has a bulk viscosity of not more than 5000 to 10,000 poises at 25° C. However, it is within the scope of this invention to use higher molecular weight polymer, the bulk viscosity of which has been reduced, if desired, with a compatible plasticizer.

The starting polymer is characterized by the presence of more than one halogen per molecule in the majority of the molecules. The halogen may be a halogen attached to a saturated carbon atom which is in the alpha position to an olefinic or carbonyl carbon atom. A preferred class of halogens are in the form of allylic halide groups having the formula

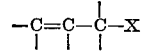

in which X is a halogen atom. Halogen atoms attached to saturated hydrocarbon chains may also be used under some conditions, for example, when brought in contact at elevated temperatures with multifunctional agents having such functional groups as alkoxides of alkali metals. The halogen atom may be selected from chlorine, bromine or iodine. It is preferred that the halogens are attached to the polymeric molecules in terminal positions, i.e. at the ends of linear chain molecules and, if the molecules are branched, at the end of branches. In other words, the preferred polymer contains molecules with two or more terminal allylic halide or haloalkyl carbonyl groups. However, the presence of allylic halide groups or other halogen groups in the middle portions of the chain molecules is not detrimental. The polymer is a homopolymer or a copolymer of two or more polymerizable olefinically unsaturated compounds and may be prepared by a free radical polymerization. Unsaturated hydrocarbons are the preferred compounds used in the preparation of the polymer, although polymerizable monomers containing oxygen, nitrogen and/or chlorine atoms in addition to carbon and hydrogen atoms can be used provided they are not active according to the Zerewitinoff test as described in J.A.C.S. 49, 3181 (1927). The preferred polymers used in this invention are low molecular weight polymers of diolefinic aliphatic hydrocarbons containing 4 to 8 carbon atoms such as butadiene-1,3, isoprene, pentadiene-1,3, 2,3-dimethylbutadiene, and best results are obtained with polymers of butadiene-1,3, with or without a minor amount of copolymerized vinyl compounds such as styrene, acrylonitrile, alkyl acrylate and others. Depending on the molecular weight of the polymer, the type and the number of halogen atoms per molecule, the halogen content of the low molecular weight polymer falls within the range of 1–15 weight percent and preferably within the range of 1.5–10 weight percent.

The low molecular weight polymer suitable for use in this invention may be prepared by various processes. One such process is a direct polymerization of monomers in the presence of halogen-containing modifiers such as described in French Patent 1,488,811. It is also possible to produce such polymers by post-polymerization modification such as halogenation of unsaturated polymers, oxidative halogenation of saturated polymers or degradative halogenation of solid polymers, under conditions such that at least two halogens are produced in a polymeric molecule.

The multifunctional compound which is reacted with the halogen-containing polymer contains a first functional group and at least one other functional group. The first group is selected from a tertiary amine group, a mercaptide and a hydrocarbyl oxide of an alkali metal. For example, it can be an aromatic or aliphatic amine, sodium alkoxide or potassium mercaptide group. The tertiary amine group is a

group where $R^1$ and $R^{11}$ are each hydrocarbon groups, generally lower aliphatic hydrocarbon groups containing up to 6 carbon atoms, preferably methyl or ethyl or the $R^1$ and $R^{11}$ groups are joined to form a ring of 3, 4, 5 or more carbon atoms, thereby forming a heterocyclic ring with the nitrogen atom.

The other functional group is less reactive towards halogen than the first functional group but contains a labile hydrogen atom capable of reacting with isocyanate. It may be a primary or secondary amino, amido, hydroxyl, mercapto, carboxyl, thiocarboxyl, sulpho or sulphino group. Preferably, the multifunctional compound is a low molecular weight compound with the functional groups separated by at least one carbon atom. The portion of the molecule between the first and other functional groups is generally an aliphatic hydrocarbon chain preferably containing up to 10 carbon atoms, or an aromatic nucleus, preferably benzene. The preferred difunctional compounds contain at one end a tertiary amine group or a mercaptide group and at the other end a different functional group such as —OH, —SH, —COOH, —CSOH, —COSH, —CSO₃H, —CSO₂H, —NH₂, —CONH₂. The preferred other functional groups are hydroxyl, carboxyl and primary amino groups.

Examples of difunctional compounds containing at one end a tertiary amine group are 3-diethyl amino-propanol-1, N,N-diethyl glycine, N',N'-dimethyl trimethylene diamine-1,3 N,N-diethyl amino ethane thiol, N,N-dimethyl amino m-phenol, N,N-dimethyl amino p-benzoic acid. A representative example of polyfunctional tertiary amine is triethanolamine. The difunctional compounds containing a mercaptide group are prepared by reacting mercaptan compounds such as β-mercapto ethanol, p-amino benzene thiol, or β-mercapto ethyl amine with alkali metals in the presence of a low molecular weight alcohol containing up to 8 carbon atoms. The alkali metals include lithium, sodium or potassium and ethanol, propanol and butanol are the typical alcohols that can be used in the reaction. Instead of the mercaptan compounds, alcohols such as amino ethanol, aminobenzyl alcohol can be reacted with alkali metals to produce a difunctional agent containing reactive hydrocarbyl oxide group.

The reaction between the halogen-containing polymer as described above and the multifunctional compound may be conducted in solution or bulk or latex. In the solution technique, the halogen-containing polymer is dissolved in a solvent which is inert to halogen and to the functional groups, such as toluene or nitrobenzene. The multifunctional compound is then added and the solution is then boiled or refluxed until the reaction is complete. The solution may be filtered and then the polymeric product is recovered by precipitation, generally in methanol or in a mixture of acetic acid in methanol. An antioxidant is generally added to the product to prevent oxidative degradation on standing.

The product of the above reaction is an isocyanate-curable polymer of an olefinically unsaturated compound. The predominant and main part of the polymer consists of the polymerized units of said compound which are linked together by carbon to carbon bonds. These polymerized units of compounds such as butadiene, styrene or ethyl acrylate are free of labile hydrogen atom and not capable of reacting with isocyanate. They have more than one functional group in the terminal position joined to the main part of the polymer through a hetero atom selected from nitrogen, oxygen or sulphur. Polymer molecules containing two functional groups having a labile hydrogen atom capable of reacting with isocyanate are preferred, although polymers with several such groups in the terminal positions can also be used in the reaction with polyisocyanates. The reactivity of the groups is not restricted to the reaction with isocyanate; they can be condensed with other reactive groups to form, for example, ester or amide bonds. When the polymer is difunctional, that is, contains two functional groups per molecule and is reacted with diisocyanate, a chain-extended higher molecular weight polymer is obtained. This chain-extended polymer may be worked on rubber or resin processing equipment and cured by a crosslinking agent to form a rubbery or resinous material. When the polymer is more than difunctional or a polyisocyanate containing more than two isocyanate groups is reacted, a rubbery or resinous crosslinked polymer is obtained. Depending on the type of the functional groups, the reaction with an isocyanate group produces a chain-extended or crosslinked polymer with urethane or urea linkages; hydroxyl groups give a urethane linkage (—NH—CO—O—R—) while primary amines result in a urea

linkage.

The reactivity of the reactive polymer of this invention is controlled by the selection of a multifunctional agent having the desired functional group. This functional group being removed from the main polymer part by a hetero atom of the first functional group is not affected by the structure, type of bonds and substituents in the monomeric units in the main part of the polymer as it is in the case of the prior art difunctional polymers. In contrast to polymeric glycols or diamines of the prior art, the isocyanate-curable polymers of this invention are remarkably insensitive to varying proportions of polyisocyanate.

The reactive polymers of this invention are preferably low molecular weight polymers and most preferably pourable polymers so that they can be easily blended with polyisocyanates or other crosslinking agents, and easily shaped and cured. The reaction of dihydroxyl polymers of olefinically unsaturated compounds with polyisocyanates is well known. The use of polyurethanes and polyureas in the rubber and resin technology is also known so that a detailed description seems to be redundant.

The invention is further illustrated by, but not limited to, the following examples. In these examples, all parts are parts by weight.

EXAMPLE I 3.5 grams of 3-diethylamino-propanol were dissolved in 15 mls. of ethanol. 20 grams of a bromine terminated polybutadiene produced according to the process described in French Pat. 1,488,811 and having an intrinsic viscosity in toluene of 30° C. of 0.30 were dissolved in 75 mls. of toluene. The ethanolic solution was then added with vigorous stirring to the toluene solution. The resulting mixture was heated to boiling and then allowed to cool. The product produced was recovered by precipitation in an excess of methanol. A quantitative yield of product was obtained. The polymer so produced was purified by precipitation from toluene into acetone. The purified polymer, which had an intrinsic viscosity in toluene at 30° C. of 0.76, was then dissolved in toluene and varying amounts of a 4% solution of toluene diisocyanate in toluene were added. The solutions were stirred and poured onto glass sheets. The films produced after evaporation of solvent were allowed to cure for a week at room temperature and at the end of that time were submitted to stress/strain testing. The properties of the films are presented in Table I.

TABLE I

| Vulcanizate property | Toluene diisocyanate (parts per 100 parts polymer) | | | |
| --- | --- | --- | --- | --- |
| | 4.0 | 5.6 | 7.2 | 8.0 |
| Tensile strength (p.s.i.) | 269 | 245 | 263 | 265 |
| Elongation (percent) | 360 | 265 | 255 | 260 |
| Modulus at 100% elongation (p.s.i.) | 57 | 72 | 83 | 70 |

EXAMPLE II

A solution of 4.2 gms. of N,N-diethylglycine hydrochloride in 15 mls. of ethanol containing 0.55 gm. of sodium was vigorously stirred with a solution of 20 gms. of the bromine terminated polybutadiene of Example I. The mixture was heated to boiling and refluxed for one hour. The solution was then allowed to cool and the product was recovered by precipitation in an excess of a 20% solution of acetic acid in methanol. The polymer obtained in quantitative yield was purified by precipitation from toluene into acetone. The purified polymer was then dissolved in toluene and a solution of various quantities of toluene diisocyanate in solution added. The solution was stirred and the whole poured onto a glass sheet. The film produced after evaporation of solvent was allowed to cure for a week and at the end of that time was submitted to stress/strain testing. The results are shown in Table II.

TABLE II

| Vulcanizate property | Toluene diisocyanate (parts per 100 parts polymer) | | |
| --- | --- | --- | --- |
| | 4.0 | 5.6 | 8.0 |
| Tensile strength (p.s.i.) | 268 | 378 | 51 |
| Elongation (percent) | 235 | 130 | 15 |
| Modulus at 100% elongation (p.s.i.) | 230 | 336 | 41 |

EXAMPLE III 1.04 gms. of dimethylamino meta-phenol were mixed with 20 gms. of the bromine terminated polybutadiene of Example I. The mixture was left for 1 week at room temperature in a closed container to allow time for complete reaction. At the end of this time, the container was opened and a semi-solid mass was found therein. The mass, which had an intrinsic viscosity in toluene at 20° C. of 0.63, was taken up in toluene and 4.8 gms. of toluene diisocyanate dissolved in toluene were added. A film of cured product was obtained as outlined in Example I. The film had a tensile strength of 260 p.s.i., an elongation of 300% and a modulus at 100% elongation of 210 p.s.i.

EXAMPLE IV

A solution of 3.0 gms. of p-aminobenzenethiol in 15 mls. of ethanol containing 0.75 gm. sodium was mixed with a solution of 20 gms. of the bromine terminated polybutadiene of Example I. The mixture was heated to boiling and a precipitate which was formed was removed by filtration. The polymer was coagulated in methanol and purified by precipitation from toluene solution into acetone. The purified polymer was redissolved in toluene and various quantities of a polyisocyanate, containing 32% isocyanate (available under the trade name Mondur R), was added in solution. The solutions were stirred and poured onto glass sheets. Films of cured product were obtained as outlined in Example I.

The above procedure was repeated except that β-mercapto ethanol and β-mercaptoethylamine, respectively, were used in place of p-aminobenzenethiol and, in each case, 2.0 gms. of the β compound were used with 1.0 gm. of sodium.

The polymer modified with β-mercaptoethylamine cured so fast that poured films could not be produced but hand tests indicated that the vulcanizates had high tensile strength. The properties of the other films are shown in Table III.

TABLE III

| Modifying compound | Vulcanizate property | Toluene polyisocyanate (parts per 100 parts ploymer) | | |
| --- | --- | --- | --- | --- |
| | | 4.8 | 6.4 | 7.2 |
| p-Aminobenzenethiol | Tensile strength (p.s.i.) | 610 | 750 | 1,100 |
| | Elongation (percent) | 150 | 160 | 210 |
| | 100% modulus (p.s.i.) | 450 | 520 | 570 |
| β-Mercaptoethanol | Tensile strength (p.s.i.) | 550 | 625 | 740 |
| | Elongation (percent) | 103 | 120 | 150 |
| | 100% modulus (p.s.i.) | 490 | 550 | 580 |

A comparative experiment was carried out with a liquid polybutadiene having terminal hydroxy groups attached directly to the carbon atoms of butadiene unit. It cured slowly with 4.8 to 7.2 parts of the polyisocyanate and produced films having a tensile strength in the range between 270 and 290 p.s.i.

EXAMPLE V

A 30% emulsion of an allylic bromine terminated polybutadiene was prepared as described in French Pat. 1,488,811 by polymerizing to about 80% conversion. 16 parts per 100 parts of butadiene monomer of 3-diethylamino propanol were then added to the emulsion and the emulsion was maintained at 130° F. for 75 minutes. The polymer was recovered from the latex and cured with 5.6 parts of toluene diisocyanate by the method of Example I. The cured product had a tensile strength of 675 p.s.i., an elongation of 350% and a modulus at 100% elongation of 577 p.s.i.

The above procedure was repeated, except that 24 parts of 3-diethylamino propanol were added to the latex. The cured product had a tensile strength of 722 p.s.i., an elongation of 330% and a modulus at 100% elongation of 644 p.s.i.

The above examples indicate that terminally active products can be produced from active halogen containing polymers and these terminally active polymers can be cured to elastomeric products having satisfactory stress/strain characteristics.

EXAMPLE VI

A liquid bromine terminated polymer of ethyl acrylate was prepared by the emulsion polymerization of ethyl acrylate in the presence of 15 parts/100 parts of monomer of carbon tetrabromide using the method described in French Pat. 1,488,811 for polybutadiene. The polymer was cogulated and dried; 100 grams of it was dissolved in toluene to give a 25% solution, which was then mixed with a solution of 12 grams of KOH in 66 grams of ethylene glycol and the mixture was boiled for 5 minutes. The product was precipitated and purified with pentane and acetone and finally dried at 60° C.

The resulting liquid product was mixed in bulk, as well as in solution in methyl ethyl ketone, with 5, 10 and 15 parts/100 parts of polymer, respectively, of a polyisocyanate available under the trade name Mondur R. All the mixtures satisfactorily cured to form solid rubbery material having high tensile strength.

What is claimed is:
1. A process of producing an isocyanate-curable poly- mer of an olefinically unsaturated compound which comprises treating a liquid composition comprising a low molecular weight isocyanate-non-reactive polymer of butadiene-1,3, said polymer having a molecular weight of at least about 1000, a major proportion of molecules of said polymer containing in terminal positions more than one allylic bromine atom in the terminal position, with a multifunctional compound selected from the group consisting of 3-dialkyl amino-propanol-1, N,N-dialkyl glycine, N',N'-dialkyl trimethylene diamine-1,3, N,N-dialkyl amino ethanethiol, N,N-dialkyl amino m-phenol, N,N-dialkyl amino p-benzoic acid, triethanol amine.

References Cited

UNITED STATES PATENTS

| | | | |
|---|---|---|---|
| 3,135,716 | 6/1964 | Uraneck et al. | 260—45.5 |
| 3,078,254 | 2/1963 | Zelinski et al. | 260—94.7 X |
| 3,178,398 | 8/1965 | Strobel et al. | 260—85.1 |

JOSEPH L. SCHOFER, Primary Examiner

W. F. HAMROCK, Assistant Examiner

U.S. Cl. X.R.

260—77.5, 79.5, 83.3, 83.5, 85.5, 94.7 R, 654 R